(12) United States Patent
Sinha et al.

(10) Patent No.: US 9,040,138 B2
(45) Date of Patent: May 26, 2015

(54) COMPOSITE ARTICLE INCLUDING COMPOSITE TO METAL INTERLOCK AND METHOD OF FABRICATION

(71) Applicant: General Electric Company, Schenectady, NY (US)

(72) Inventors: Shatil Sinha, Clifton Park, NY (US); Scott Roger Finn, Montgomery, OH (US); Nicholas Joseph Kray, Mason, OH (US); Peggy Lynn Baehmann, Glenville, NY (US); Dong Jin Shim, Cohoes, NY (US); Gregory Carl Gemeinhardt, Park Hills, KY (US)

(73) Assignee: General Electric Company, Niskayuna, NY (US)

( * ) Notice: Subject to any disclaimer, the term of this patent is extended or adjusted under 35 U.S.C. 154(b) by 127 days.

(21) Appl. No.: 13/872,317

(22) Filed: Apr. 29, 2013

(65) Prior Publication Data
US 2014/0322482 A1 Oct. 30, 2014

(51) Int. Cl.
*B32B 7/08* (2006.01)
*B29C 70/72* (2006.01)
*B29C 70/74* (2006.01)

(52) U.S. Cl.
CPC ........... *B32B 7/08* (2013.01); *Y10T 428/24033* (2015.01); *B29C 70/72* (2013.01); *B29C 70/745* (2013.01)

(58) Field of Classification Search
CPC .............. B32B 7/08; B32B 3/24; B32B 5/26; B32B 5/28; B32B 15/14
USPC ...................... 428/57, 102, 138, 223; 403/267
See application file for complete search history.

(56) References Cited

U.S. PATENT DOCUMENTS

| | | | |
|---|---|---|---|
| 6,835,436 | B1 | 12/2004 | Reif et al. |
| 2007/0154680 | A1 | 7/2007 | Escibar Benavides et al. |
| 2009/0077802 | A1 | 3/2009 | Moroso et al. |
| 2009/0190997 | A1 | 7/2009 | Wanthal |
| 2012/0045606 | A1 | 2/2012 | Griess |
| 2012/0219763 | A1 | 8/2012 | Hamada |

OTHER PUBLICATIONS

PCT International Search Report for PCT Application No. PCT/US2014/033531 dated Jul. 10, 2014.
Kray et al., "Attachment of Composite Article", U.S. Appl. No. 13/709,651, filed Dec. 10, 2012, 29 pages.
Kray et al., "Attachment of Composite Article", U.S. Appl. No. 13/709,559, filed Dec. 10, 2012, 32 pages.

*Primary Examiner* — Alexander Thomas
(74) *Attorney, Agent, or Firm* — John P. Darling

(57) ABSTRACT

A composite article including a composite component, a metallic component and one or more interlock components. The composite component including a plurality of composite plies and extending heightwise from a component base to a component tip and lengthwise between spaced apart component first and second edges, the composite. The metallic component including a first surface and a second surface and a plurality of openings formed therein extending from the first surface to the second surface. The metallic component including at least a portion substantially or fully embedded in the composite component. The one or more interlock components is interwoven through one or more of the plurality of openings in the metallic component and extending into and at least partially embedded in the composite component to provide an interlocking system between the composite component and the metallic component. A method of fabrication of a composite article is also provided.

20 Claims, 6 Drawing Sheets

COMPOSITE ARTICLE INCLUDING COMPOSITE TO METAL INTERLOCK AND METHOD OF FABRICATION

BACKGROUND

The invention relates to composite components often found in gas turbine engines and, particularly, composite to metallic connections often found in gas turbine engines. Bypass gas turbine engines of the turbofan type generally include a forward fan and booster compressor, a middle core engine, and an aft low pressure power turbine. A low pressure turbine rotatably drives the fan and booster compressor via a low pressure shaft, all of which form the low pressure rotor. Composite components have been developed, such as blades, vanes and static structures, and are often used in these gas turbine engines. In particular, composite airfoils have been developed and used in blades for rotatable stages of the booster compressor and in stator vanes disposed between and upstream and downstream of the blades as well in other sections of the engine such as in the fan section (fan outlet guide vanes).

It is known to manufacture aircraft gas turbine engine blade and vane airfoils from composite materials. It has been found difficult to attach composite components, such as these vanes and airfoils, to a metallic component. One particular embodiment lies in the attachment of composite airfoils to a metallic component for mounting the blade or vane to the component, such as a metallic rotor or stator portion of the engine. This is a challenge due to the magnitude of loads and limited size of the components. Typically, the attachments of these composite parts are the challenging part of that implementation. It is desired to have an integral composite/metallic attachment system that takes advantage of the composite weight. Simple adhesive bonds and joints including mechanical fasteners have been used in the past to join these two systems. The bonded joints are subject to forces and moments that tend to dislodge the composite/metallic joint, and more particularly, the composite component, such as an airfoil, from a metallic component, such as a mount of the blade or vane. On the other hand, mechanically fastened joints require fabricating openings that cut into the fibers of the composite structure that may weaken the overall capability of the composite structure. To address this issue, the composite structure may include additional strengthening at the joint, negatively affecting any weight benefit.

It is therefore highly desirable to provide a joining means for securely and robustly joining composite components and metallic components that is capable of resisting forces and moments that tend to dislodge the composite components from the metallic components and without weakening the composite structure. It is additionally desirable to provide a means for securely and robustly joining composite components, such as airfoils, in both gas turbine engine rotor and fan frame assemblies to metallic components, such as a metallic mount of the blade or vane, and thus enable the composite/metallic joint to resist forces and moments that tend to dislodge the composite airfoils from the metallic mount.

BRIEF DESCRIPTION

These and other shortcomings of the prior art are addressed by the present disclosure, which provides a composite article and method of fabrication.

In accordance with an embodiment, provided is a composite article including a composite component, a metallic component and one or more interlock components. The composite component extending heightwise from a component base to a component tip and lengthwise between spaced apart component first and second edges. The composite component including a plurality of plies. The metallic component including a first surface and a second surface and a plurality of openings formed therein and extending from the first surface to the second surface. The metallic component further including a first portion extending heightwise from below the component base up through the component base into the composite component and a second portion at an upper end of the first portion, wherein the second portion is substantially or fully embedded in the composite component, the second portion including heightwise spaced apart base and tip. The one or more interlock components interwoven through one or more of the plurality of openings in the metallic component and extending into and at least partially embedded in the composite component to provide an interlocking system between the composite component and the metallic component.

In accordance with another embodiment, provided is a composite article including a composite component and a pre-threaded metallic component. The composite component extending heightwise from a component base to a component tip and lengthwise between spaced apart component first and second edges. The composite component further including a composite material lay-up of a plurality of filament reinforced composite plies, wherein each of the plurality of filament reinforced plies have widthwise spaced apart ply sides and ply edges therebetween. The pre-threaded metallic component including a first surface and a second surface and a plurality of openings formed therein and extending from the first surface to the second surface. The pre-threaded metallic component further including one or more interlock components interwoven through one or more of the plurality of openings in the pre-threaded metallic component. The one or more interlock components extending into and is at least partially embedded in the composite component to provide an interlock system between the composite component and the pre-threaded metallic component. The composite component and the pre-threaded metallic component are co-cured.

In accordance with yet another embodiment, provided is a method of fabricating a composite article. The method including laying up a plurality of filament reinforced composite plies formed from a composite material, inserting a pre-threaded metallic component, into the plurality of filament reinforced composite plies during the laying up of the plurality of filament reinforced composite plies to form a composite to metallic interface, and co-curing the plurality of filament reinforced composite plies and the pre-threaded metallic component to form a composite article including an interlock system for the composite to metallic interface. Each of the plurality of filament reinforced composite plies including widthwise spaced apart ply sides and ply edges therebetween. The pre-threaded metallic component including a first surface and a second surface and a plurality of openings formed therein and extending from the first surface to the second surface. The pre-threaded metallic component further including one or more interlock components interwoven through one or more of the plurality of openings. The one or more interlock components extending into and is at least partially embedded in the plurality of filament reinforced composite plies to provide an interlock system between the plurality of filament reinforced composite plies and the pre-threaded metallic component.

Other objects and advantages of the present disclosure will become apparent upon reading the following detailed description and the appended claims with reference to the accompanying drawings.

BRIEF DESCRIPTION OF THE FIGURES

The above and other features, aspects, and advantages of the present disclosure will become better understood when the following detailed description is read with reference to the accompanying drawings in which like characters represent like parts throughout the drawings, wherein.

DETAILED DESCRIPTION

The disclosure will be described for the purposes of illustration only in connection with certain embodiments; however, it is to be understood that other objects and advantages of the present disclosure will be made apparent by the following description of the drawings according to the disclosure. While preferred embodiments are disclosed, they are not intended to be limiting. Rather, the general principles set forth herein are considered to be merely illustrative of the scope of the present disclosure and it is to be further understood that numerous changes may be made without straying from the scope of the present disclosure.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). The terms "upper", "lower", "top", "bottom", "first", "second", or the like are intended for the purpose of orienting the reader as to specific components parts.

Moreover, in this specification, the suffix "(s)" is usually intended to include both the singular and the plural of the term that it modifies, thereby including one or more of that term (e.g., "the opening" may include one or more openings, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

Figure 1:
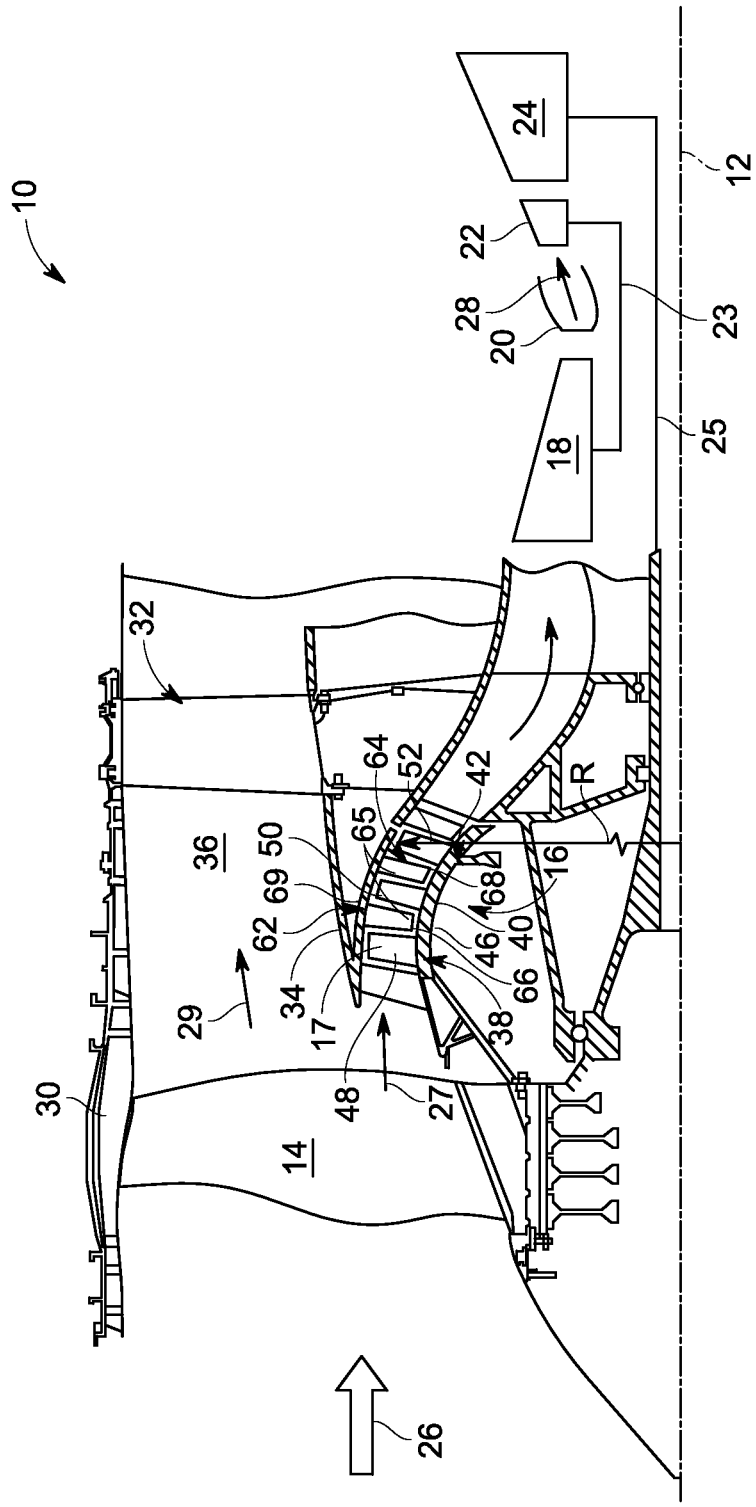
FIG. 1 is a longitudinal part sectional and part diagrammatical view illustration of aircraft turbofan gas turbine engine including composite articles according to one or more embodiments shown or described herein.

Illustrated in FIG. 1 is an exemplary aircraft turbofan gas turbine engine 10 circumscribed about an engine centerline axis 12 and suitably designed to be mounted to a wing or fuselage of an aircraft. The engine 10 includes, in downstream serial flow communication, a fan 14, a booster or a low pressure compressor 16, a high pressure compressor 18, a combustor 20, a high pressure turbine (HPT) 22, and a low pressure turbine (LPT) 24. The HPT or high pressure turbine 22 is joined by a high pressure drive shaft 23 to the high pressure compressor 18. The LPT or low pressure turbine 24 is joined by a low pressure drive shaft 25 to both the fan 14 and booster or low pressure compressor 16.

In typical operation, air 26 is pressurized by the fan 14 and an inner portion of this air is channeled through the low pressure compressor 16 which further pressurizes the air. The pressurized air is then flowed to the high pressure compressor 18 which further pressurizes the air. The pressurized air is mixed with fuel in the combustor 20 for generating hot combustion gases 28 that flow downstream in turn through the HPT 22 and the LPT 24. Energy is extracted in the two turbines for powering the fan 14, low pressure compressor 16, and the high pressure compressor 18. A flow splitter 34 surrounding the booster compressor 16 immediately behind the fan 14 includes a sharp leading edge which splits the fan air 26 pressurized by the fan 14 into a radially inner stream 27 channeled through the booster compressor 16 and a radially outer stream 29 channeled through an annular fan bypass duct 36.

A fan nacelle 30 surrounding the fan 14 is supported by an annular fan frame 32. The low pressure compressor 16 is suitably joined to the fan 14 forward of the fan frame 32, is disposed radially inboard of the annular flow splitter 34, and is spaced radially inwardly from an inner surface of the fan nacelle 30 to partially define the annular fan bypass duct 36 therebetween. The fan frame 32 supports the nacelle 30.

The compressor 16 has rotatable first, second, and third compressor stages 38, 40, 42 with first, second, and third compressor blade rows 48, 50, 52, respectively. A plurality of compressor blades 17 of the first, second, and third compressor blade rows 48, 50, 52 extend radially outwardly from a rotatable hub 46 connected to the fan 14. The compressor 16 has non-rotatable first and second vane stages 62, 64 with first and second vane rows 66, 68, respectively. Compressor vanes 65 of the first and second vane stages 62, 64 extend radially inwardly from a non-rotatable shell or outer band 69 or other annular structure fixedly connected to a forward or fan frame 32. The first, second, and third compressor blade rows 48, 50, 52 are interdigitated with the first and second vane rows 66, 68. The compressor blades and vanes 17, 65 may include composite airfoils. It is also known to mount compressor blades having composite airfoils to disks or drums of gas turbine engines.

Illustrated in FIGS. 2-9 is a composite article 70, such as a composite airfoil, that may be designed for use in a gas turbine engine blade or vane exemplified by the compressor blades and vanes 17, 65 illustrated in FIG. 1 and described above, or a static case structure including composite/metallic components. The composite article 70 is illustrated as comprised of a composite component 72 and a metallic component 74. The composite component 72 extends heightwise from a component base 76 to a component tip 78 and lengthwise between spaced apart component first and second edges, or a forward edge (FE) 80 and an aft edge (AE) 82. In an embodiment, the composite component 72 is formed from a composite material lay-up 84 of filament reinforced composite plies 86. As used herein, the terms "lamination" and "ply" are synonymous. The plies 86 are generally comprised of a fiber reinforced material in which the fibers are oriented in one direction, and commonly referred to as a tape, or in multiple directions, as in a weave or braid. The plies 86 essentially form the composite component 72. Each of the plurality of filament reinforced plies 86 have widthwise spaced apart ply sides 87 and ply edges 89 therebetween. In an embodiment, during manufacturing, the plies 86 are layed up, around and against the metallic component 74 and then molded and cured.

Figure 2:
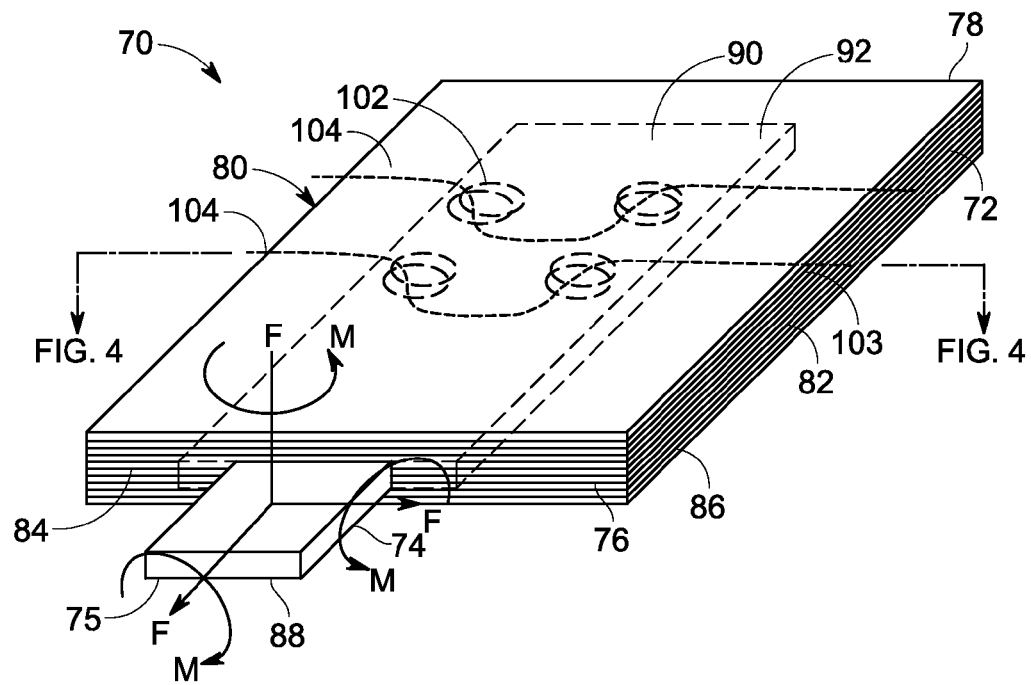
FIG. 2 is a diagrammatical perspective view illustration of a composite article having a metallic component inserted in a composite component of the article according to one or more embodiments shown or described herein.

In the illustrated embodiment, the composite component 72 is formed about the metallic component 74, such as in the case of a spar. In an embodiment, and as best illustrated in FIG. 2, the metallic component 74 includes a first portion 88, such as a shank, extending from below the component base 76, up through the component base 76, and into the composite component 72. The metallic component 74 further includes a second portion 90, also referred to herein as a tab, at an upper end 92 of the first portion, or shank, 88. The second portion, or tab, 90 is either substantially or fully embedded in the composite component 72. In an embodiment, the second portion 90 may be substantially wider than the first portion 88 in a generally chordal direction between the composite component 72 forward edge 80 and the aft edge 82. The second portion, or tab, 90 includes widthwise spaced apart tab forward edge (TFE) 94 and tab aft edge (TAE) 96 at or near a tab base 98 and a tab tip 100. In an embodiment, the metallic component 74 may be made of a metallic material having a different stiffness and/or strength than that of the composite component 72.

In an embodiment, the metallic component 74 may provide a means to mount the composite component 72, such as on a rotor or static structure of the engine. In an embodiment, such as an airfoil embodiment, at least, the second portion 90 of the metallic component 74 is designed to resist forces "F" and moments "M", as illustrated in FIG. 2, that tend to loosen and dislodge the composite component 72 from the metallic component 74. In an airfoil embodiment of the composite article 70, the forces "F" produce the moments "M" because the composite component 72, such as a vane or blade, containing the metallic component 74 is mounted cantilevered from the rotor or static structure of the engine. In an airfoil embodiment of the composite article 70, forces "F" generally act along three orthogonal axis as indicated in FIG. 2, a lengthwise or axial first axis which is generally parallel to the chord between the airfoil leading and trailing edges, or forward edge 80 and aft edge 82 as illustrated, a widthwise or circumferential second axis which is generally tangential to a circumference defined by a radius R normal to the engine centerline axis 12 (FIG. 1), and a heightwise or radial third axis along the radius. Moments "M" are indicated about the first, second, and third axes.

Figure 3:
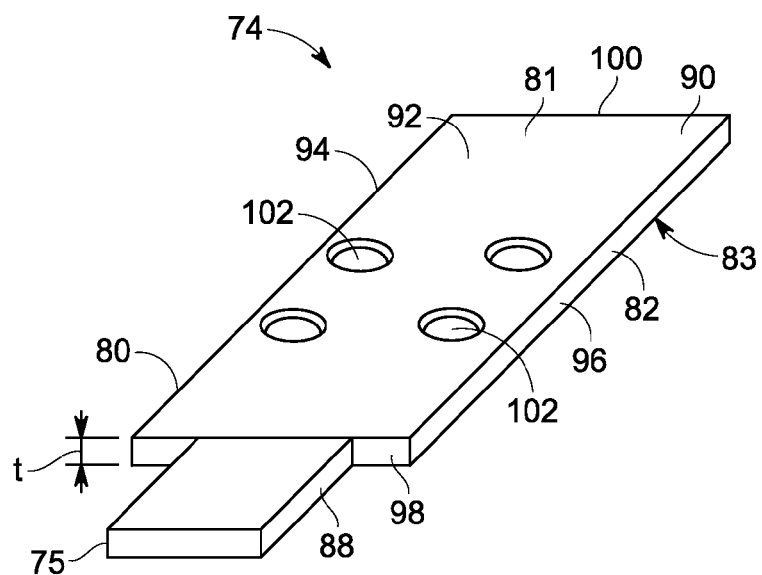
FIG. 3 is a diagrammatical perspective view illustration of the metallic component of FIG. 2.
Figure 4:
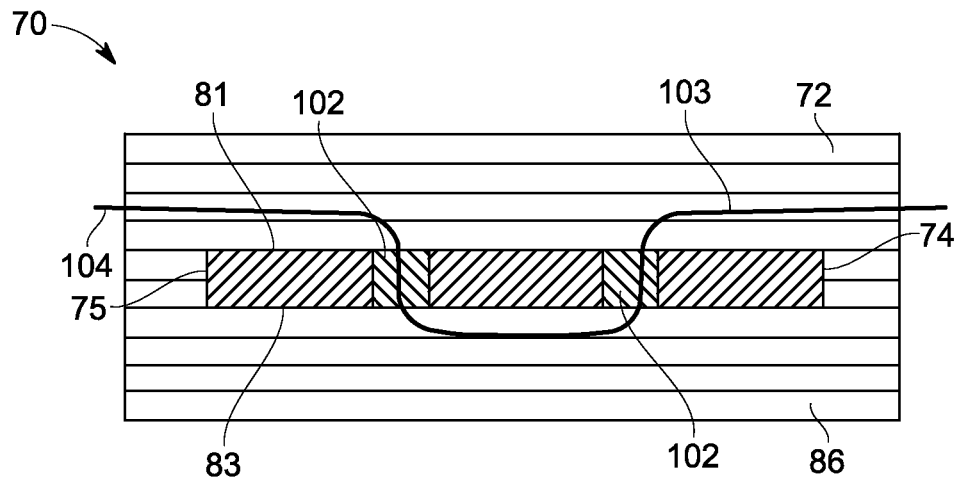
FIG. 4 is a diagrammatical cross sectional view illustration of the composite article, including the composite component and the metallic component, taken through line 4-4 of FIG. 2.

Referring again to FIG. 3, the metallic component 74 includes a plurality of openings 102 formed therethrough a thickness "t". It should be understood that the number of openings 102, orientation and geometry of such openings (as described presently) is design dependent and may be optimized based on specific load conditions. In an embodiment, as illustrated in FIGS. 2-4, the metallic component 74 includes four openings 102, each formed having a substantially circular geometry. The four openings 102 are spaced substantially equidistant from one another and in a central area of the second portion, or tab, 90 of the metallic component 74. Each of the plurality of openings 102 extends from a first, or upper, surface 81 of metallic component 74 to an opposed second, or lower, surface 83 of the metallic component 74, and provide an opening or passageway therethrough the metallic component 74.

As illustrated in FIGS. 2-4, one or more interlock components 103, and more particularly, one or more fiber tows 104, are interwoven through each of the plurality of openings 102 formed in the metallic component 74, to form a pre-threaded metallic component 75. In an embodiment, the one or more fiber tows 104, may be referred to herein as fiber bundles, and are generally comprised of a plurality of individual fibers. The one or more fiber tows 104 are interwoven through the metallic component 74 to provide an interlocking system at the composite to metallic joining between the composite component 72 and the metallic component 74. In an embodiment, each of the one or more fiber tows 104 is comprised of one or more dry fibers. The fibers may be provided as substantially dry to support a resin injection process (RTM), or as wetted tows to support a pre-preg laminate construction. In an embodiment, the one or more fiber tows 104 may be comprised of at least one of carbon, glass, boron, aromatic polyamide, p-phenylenetherephtalamide (Kevlar®), extended-chain polyethylene (SPECTRA®), aluminum oxide, or silicon carbide.

As previously alluded to, the geometry, orientation, and number of openings 102 formed in the metallic component 74 may be optimized for a given load condition. Accordingly, the plurality of openings 102 may be provided as holes, slots, or any geometric shape that allows the one or more fiber tows 104 or textile (described presently) to be aligned in the desired direction. In addition, the orientation of the one or more interlock components 103, and more specifically the one or more fiber tows 104, may be optimized for a given load condition. During fabrication of the composite article 70, the one or more fiber tows 104 are pre-threaded through the plurality of openings 102 formed in the metallic component, to define a pre-threaded metallic component 75. The disclosed design is specifically designed for a co-cured configuration where the composite layup that forms the composite component 72 is conducted in conjunction with the insertion of the metallic component 74, having been layed up by hand or machine. Utilizing the disclosed one or more interwoven interlock components to join the metallic component 74 and the composite component 72 will allow the interface strength between the composite material and the metallic material to be enhanced and the load carrying capability increased. In an embodiment, by interweaving the one or more fiber tows 104 through the metallic component 74 so as to be present during the composite layup, an increased load can be transmitted at the composite to metal connection over a conventional adhesive bond or co-cured joint/connection. The one or more fiber tows 104 provide an increase in the tensile and/or shear capability of the composite/metal joint depending on the layout of the one or more fiber tows 104, the plurality of openings 102 and a load path.

Figure 5:
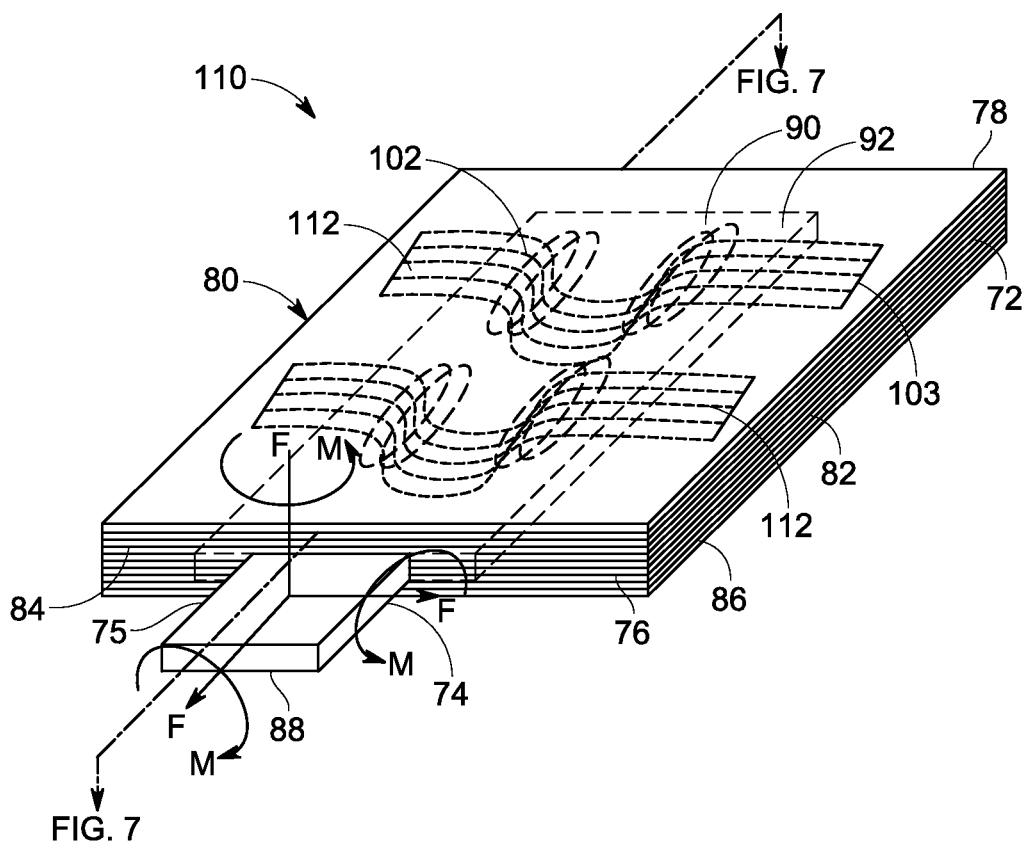
FIG. 5 is a diagrammatical perspective view illustration of another embodiment of a composite article having a metallic component inserted in a composite component of the article according to one or more embodiments shown or described herein.
Figure 6:
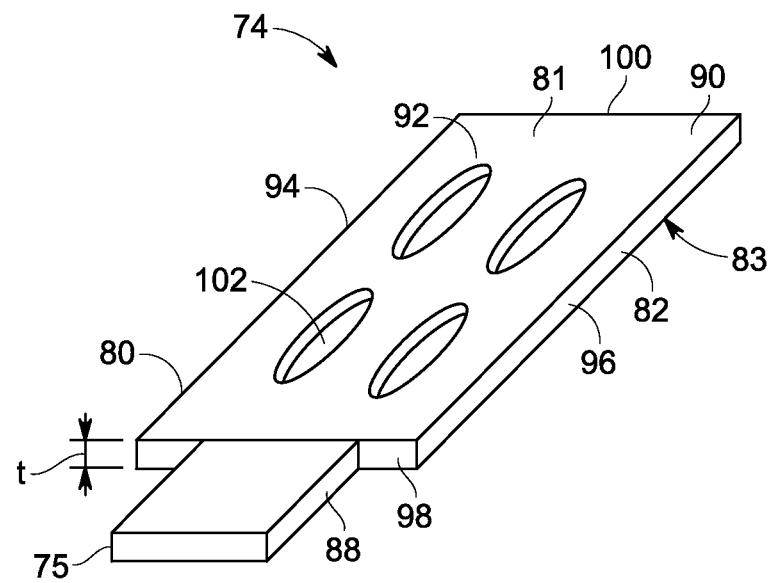
FIG. 6 is a diagrammatical perspective view illustration of the metallic component of FIG. 5.
Figure 7:
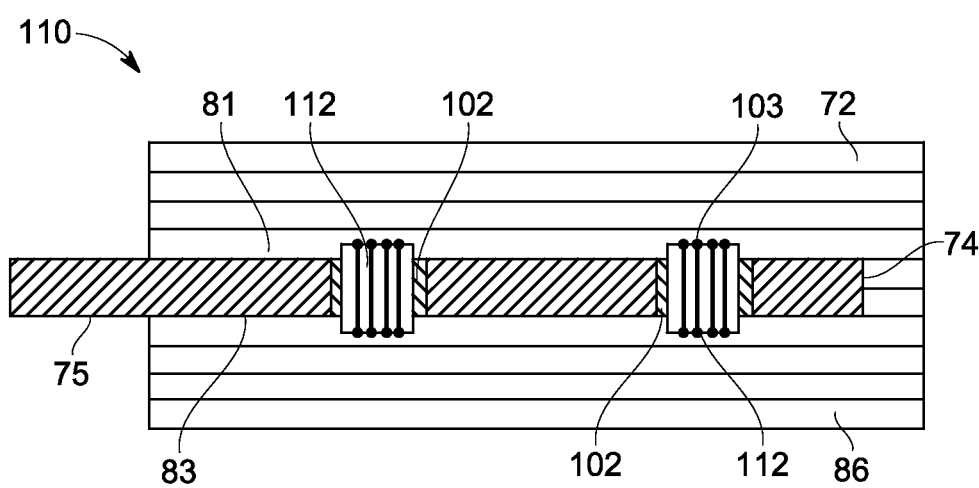
FIG. 7 is a diagrammatical cross sectional view illustration of the composite article, including the composite component and the metallic component, taken through line 7-7 of FIG. 5.

Referring now to FIGS. 5-7, wherein like numbers represent like parts throughout the embodiments, illustrated is an embodiment of a composite article 110, generally similar to the previously described composite article 70 of FIGS. 2-4. In this particular embodiment, the one or more interlock components 103 include a textile 112, in place of the one or more fiber tows 104, as described in FIGS. 2-4. The textile 112 may be comprised of one or more strips of woven fabric, non-crimped fabric, braided tube, or the like. As best illustrated in FIG. 5, the fiber 112 is illustrated as being interwoven through the metallic component 74 via a plurality of openings 102. More particularly, the textile 112 extends through the plurality of openings 102 from the first, or upper, surface 81 to the second, or lower, surface 83. As best illustrated in FIG. 6, in this embodiment the plurality of openings 102 are formed substantially oval in geometry to allow for the passage of the textile 112 therethrough the metallic component 74.

Referring to FIGS. 8 and 9, again wherein like numbers represent like parts throughout the embodiments, illustrated is an embodiment of a composite article 120, generally similar to the previously described composite article 70 of FIGS. 2-4, except in this particular embodiment, the one or more interlock components 103, and more particularly the one or more fiber tows 104, are illustrated as oriented in an opposed direction to the embodiment of FIGS. 2-4. More specifically, the one or more fiber tows are illustrated as being interwoven through the metallic component 74 via a plurality of openings 102, wherein the one or more fiber tows are oriented in a direction substantially parallel to a major axis of the metallic component 74. As illustrated, the one or more fiber tows 104 extend through the plurality of openings 102 from the first, or upper, surface 81 to the second, or lower, surface 83. As best illustrated in FIG. 6, in this embodiment the plurality of openings 102 are formed substantially circular in geometry to allow for the passage of the one or more fiber tows 104 therethrough the metallic component 74.

Figure 8:
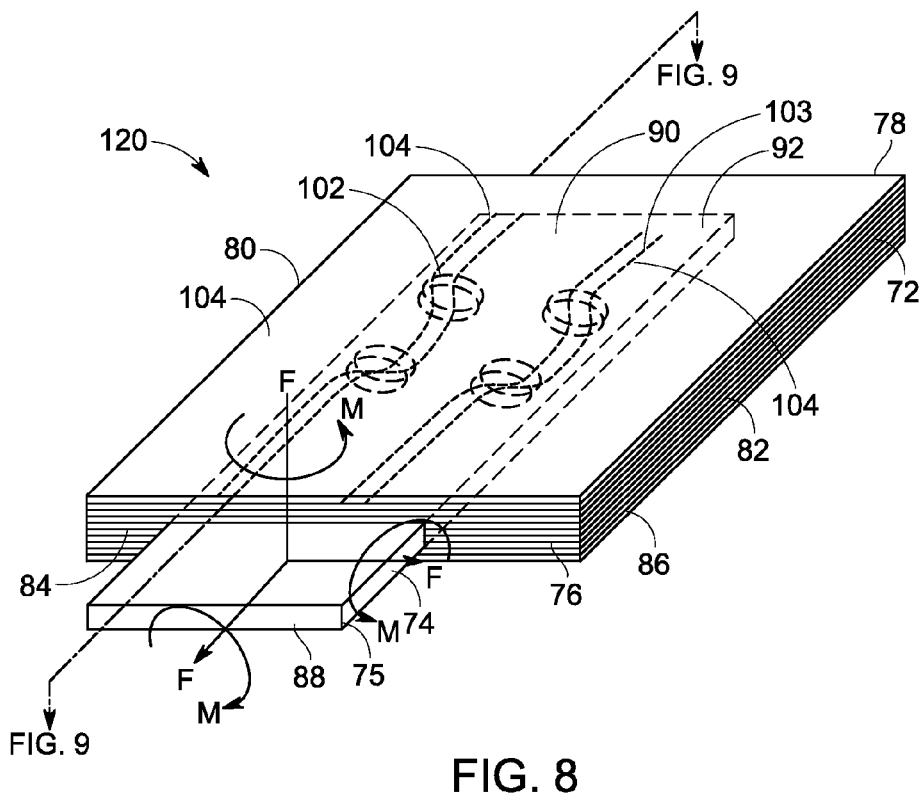
FIG. 8 is a diagrammatical perspective view illustration of another embodiment of a composite article having a metallic component inserted in a composite component of the article according to one or more embodiments shown or described herein.

In addition, as best illustrated in FIG. 8, the metallic component 74 includes a substantially rectangular shape. More specifically, in contrast to the embodiment of FIGS. 2-7, the second portion 90 of the metallic component 74 may be substantially equivalent in width to the first portion 88 in a generally chordal direction between the composite component 72 forward edge 80 and the aft edge 82. Similar to the previously described embodiments, the second portion, or tab, 90 is either substantially or fully embedded in the composite component 72.

Figure 9:
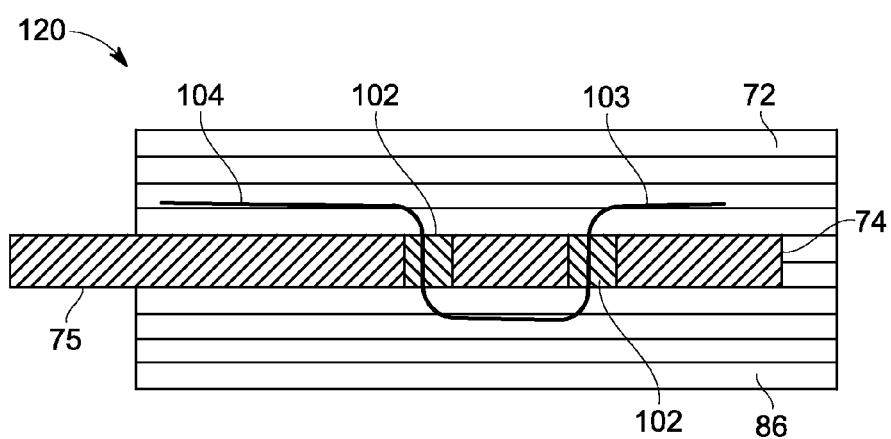
FIG. 9 is a diagrammatical cross sectional view illustration of the composite article, including the composite component and the metallic component, taken through line 9-9 of FIG. 8.

As illustrated in FIGS. 8 and 9, one or more fiber tows 104 are interwoven through each of the plurality of openings 102. More specifically, one or more fiber tows 104 are interwoven through the metallic component 74 to provide an interlocking system at the composite to metallic joining between the composite component 72 and the metallic component 74. As previously described, each of the one or more fiber tows 104 is a dry fiber and may be provided as substantially dry to support a resin injection process (RTM), or as wetted tows to support a pre-preg laminate construction.

As previously indicated, irrespective of the use of one or more fiber tows, or a textile, to provide the interwoven joint strength, a method of fabricating the composite article disclosed herein requires a co-cured configuration. More specifically, the method requires that the composite layup be done in conjunction with the insertion of the metallic component having the one or more interlock components interwoven therein.

Figure 10:
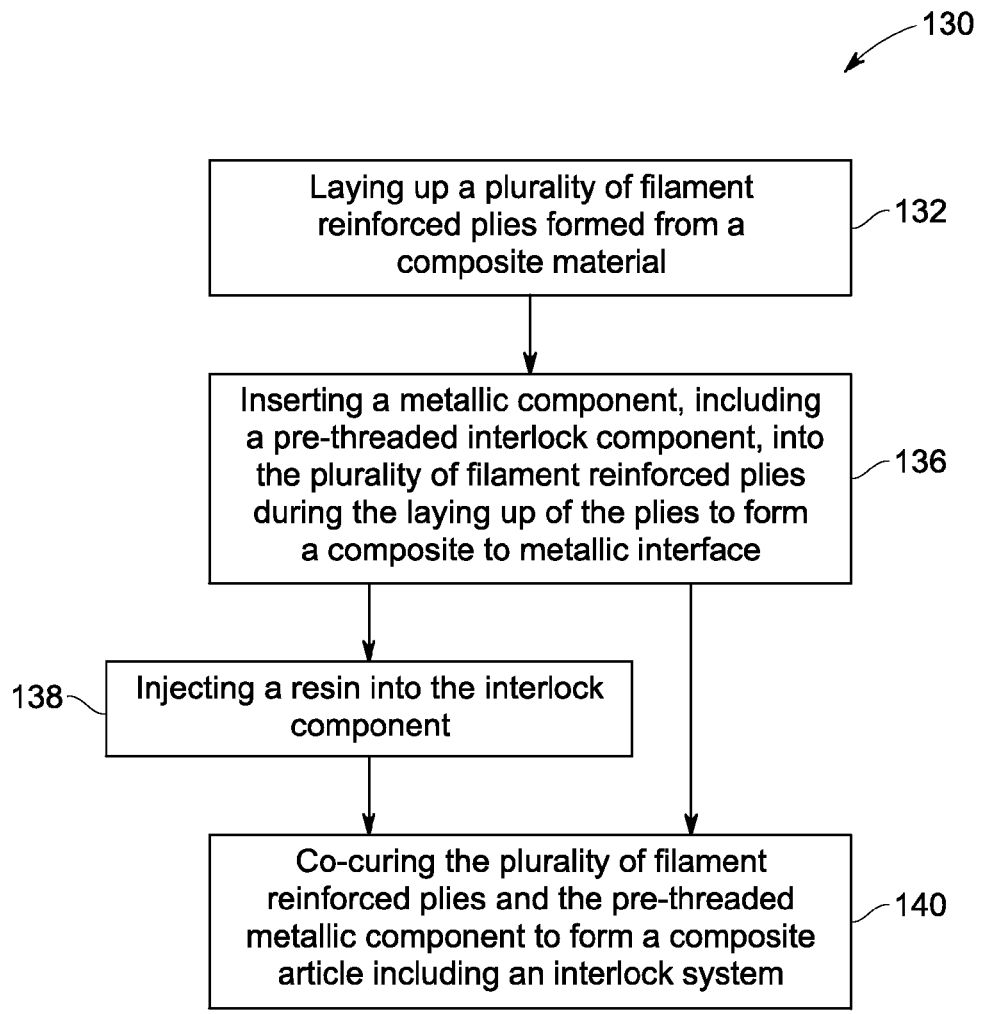
FIG. 10 is a schematic block diagram illustrating the method of fabrication in accordance with one or more embodiments shown or described herein.

Referring now to FIG. 10, illustrated is a flow chart depicting one implementation of a method 130 of making a composite article including a composite-to-metal interlock system according to one or more embodiments shown or described herein. The method 130 includes manufacturing the composite article to ultimately include the composite to metal interlock system by initially laying up a composite material comprising a plurality of filament reinforced composite plies 86, at a step 132. The plurality of filament reinforced composite plies 86 are formed of a composite material. Next, at a step 134, the method includes inserting a pre-threaded metallic component, into the plurality of filament reinforced composite plies during the laying up of the plurality of filament reinforced composite plies to form a composite to metallic interface. The laying up of the filament reinforced composite plies is continued until the metallic component is completely enclosed or embedded therein. As illustrated in FIG. 10, when the interlock component is formed of dry tows or textile (unimpregnated), a resin injecting step 136 may be included. When pre-impregnated or wetted tows are used, the injection step 136 is not required. Finally at a step 138, the plurality of filament reinforced composite plies, having the pre-threaded metallic component inserted therein, are next co-cured to form the completed composite article. The co-curing of the composite layers and the pre-threaded metallic component provides an interlock system at a composite to metallic interface. As previously detailed, the pre-threaded metallic component includes a first surface and a second surface and a plurality of openings formed therein and extending from the first surface to the second surface. The pre-threaded metallic component further includes the at least one interlock component interwoven through one or more of the plurality of openings. During insertion of the pre-threaded metallic component into the composite plies, at step 134, the one or more interlock components extends into and is at least partially embedded in the plurality of filament reinforced composite plies to provide the interlock system between the plurality of filament reinforced composite plies and the pre-threaded metallic component.

It is anticipated that the initial threading of the one or more fiber tows or textile as disclosed herein into the plurality of openings formed in the metallic component may include any number of variations or orientations, and is not limited by the disclosed illustrations. For instance, in an embodiment the one or more fiber tows or textile may be threaded, or interwoven, through more than two openings and along a greater portion of the metallic component. In an alternate embodiment, the one or more fiber tows or textile may be threaded, or interwoven, through the openings formed in the metallic component in a plurality of orientations.

It has been determined that the weak link in a metal to composite joint is the strength of the bond between the surfaces of the metal component and the composite component. The provided composite article and method of fabrication disclosed herein provides an increase in the strength of the metal to composite joint, and thus the load carrying capability. This increase in load carrying capability allows for an increase in use of composite materials in aircraft engines, such as airfoils, including blades and vanes, and static structures, such as cases, and thereby providing an overall reduction in weight of these components.

Accordingly, described are embodiments of a composite article including a composite to metal interlock and method of fabrication. The composite article includes a composite component and a metallic component. The metallic component is pre-threaded with one or more interlock components, comprised of one or more fiber tows or a textile. The pre-threaded metallic component is embedded into the composite material forming the composite component during the layup process. Co-curing of the multiple components provides a composite article including an interlocking system, thus providing greater strength between the composite and metal materials, and an increase in load carrying capabilities.

The foregoing description of several embodiments of the present disclosure has been presented for purposes of illustration. Although the disclosure has been described and illustrated in detail, it is to be clearly understood that the same is intended by way of illustration and example only and is not to be taken by way of limitation. Obviously many modifications and variations of the present disclosure are possible in light of the above teaching. Accordingly, the spirit and scope of the present disclosure are to be limited only by the terms of the appended claims.

What is claimed is:

1. A composite article comprising:
    a composite component extending heightwise from a component base to a component tip and lengthwise between spaced apart component first and second edges, the composite component including a plurality of plies;
    a metallic component including a first surface and a second surface, the metallic component including a plurality of openings formed therein and extending from the first surface to the second surface, the metallic component including a first portion extending heightwise from below the component base up through the component base into the composite component and a second portion at an upper end of the metallic component, wherein the second portion is substantially or fully embedded in the composite component, the second portion including heightwise spaced apart base and tip, and
    one or more interlock components, each of the one or more interlock components interwoven through at least two of the plurality of openings in the metallic component and extending across one of a substantial width or substantial length of the second portion of the metallic component and into and at least partially embedded in the composite component to provide an interlocking system between the composite component and the metallic component.

2. The composite article as claimed in claim 1, wherein the one or more interlock components are oriented relative to the metallic component to optimize a given load condition.

3. The composite article as claimed in claim 2, wherein the one or more interlock components is comprised of one or more fiber tows.

4. The composite article as claimed in claim 2, wherein the one or more interlock components is comprised of a textile.

5. The composite article as claimed in claim 2, wherein the one or more interlock components support a resin injection process.

6. The composite article as claimed in claim 2, wherein the one or more interlock components support a pre-preg laminate construction.

7. The composite article as claimed in claim 1, wherein the composite component includes a composite material lay-up of a plurality of filament reinforced composite plies.

8. The composite article as claimed in claim 7, wherein the plurality of filament reinforced composite plies comprise a fiber filament ply woven composite material in the form of at least one of a tape, a braid, or a weave.

9. The composite article as claimed in claim 1, wherein the composite component is an airfoil and the metallic component is a spar mount.

10. The composite article as claimed in claim 1, wherein the plurality of openings in the metallic component are substantially circular in geometry and provide interweaving of the one or more interlock components therethrough to form a pre-threaded metallic component.

11. The composite article as claimed in claim 1, wherein the plurality of openings in the metallic component are substantially oval in geometry and provide interweaving of the one or more interlock components therethrough to form a pre-threaded metallic component.

12. The composite article as claimed in claim 1, wherein the metallic component includes a first portion and a second portion and wherein the plurality of openings are formed in the second portion.

13. A composite article comprising:
    composite component extending heightwise from a component base to a component tip and lengthwise between spaced apart component first and second edges, the composite component including a composite material lay-up of a plurality of filament reinforced composite plies, wherein each of the plurality of filament reinforced plies have widthwise spaced apart ply sides and ply edges therebetween; and
    a pre-threaded metallic component including a first surface and a second surface, the pre-threaded metallic component including a plurality of openings formed therein and extending from the first surface to the second surface, the pre-threaded metallic component including one or more interlock components, each of the one or more interlock components interwoven through at least two of the plurality of openings in the pre-threaded metallic component,
    wherein the one or more interlock components extend from one of a tab forward edge to a tab aft edge or a tab base to a tab tip of the pre-threaded metallic component and into and at least partially embedded in the composite component to provide an interlock system between the composite component and the pre-threaded metallic component, and
    wherein the composite component and the pre-threaded metallic component are co-cured.

14. The composite article as claimed in claim 13, wherein the pre-threaded metallic component includes a first portion extending heightwise from below the component base up through the component base into the composite component and a second portion at an upper end of the first portion, wherein the second portion is substantially or fully embedded in the composite component, the second portion including heightwise spaced apart base and tip.

15. The composite article as claimed in claim 13, wherein the one or more interlock components is oriented within the pre-threaded metallic component to optimize a given load condition.

16. The composite article as claimed in claim 13, wherein the one or more interlock components is comprised of one or more fiber tows.

17. The composite article as claimed in claim 13, wherein one or more interlock components is comprised of a textile.

18. The composite article as claimed in claim 13, wherein the composite component is an airfoil and the metallic component is a spar mount.

19. A method of fabricating a composite article comprising:
- laying up a plurality of filament reinforced composite plies formed from a composite material, wherein each of the plurality of filament reinforced composite plies have widthwise spaced apart ply sides and ply edges therebetween;
- inserting a pre-threaded metallic component, into the plurality of filament reinforced composite plies during the laying up of the plurality of filament reinforced composite plies to form a composite to metallic interface; and
- co-curing the plurality of filament reinforced composite plies and the pre-threaded metallic component to form a composite article including an interlock system for the composite to metallic interface,
- wherein the pre-threaded metallic component includes a first surface and a second surface and a plurality of openings formed therein and extending from the first surface to the second surface, the pre-threaded metallic component further including one or more interlock components, wherein each of the interlock components is interwoven through at least two of the plurality of openings, and
- wherein the one or more interlock components extend across one of a substantial width or substantial length of the pre-threaded metallic component and into and at least partially embedded in the plurality of filament reinforced composite plies to provide an interlock system between the plurality of filament reinforced composite plies and the pre-threaded metallic component.

20. The method of fabricating a composite article as claimed in claim 19, wherein the one or more interlock components is comprised of one or more fiber tows or a textile.

* * * * *